UNITED STATES PATENT OFFICE.

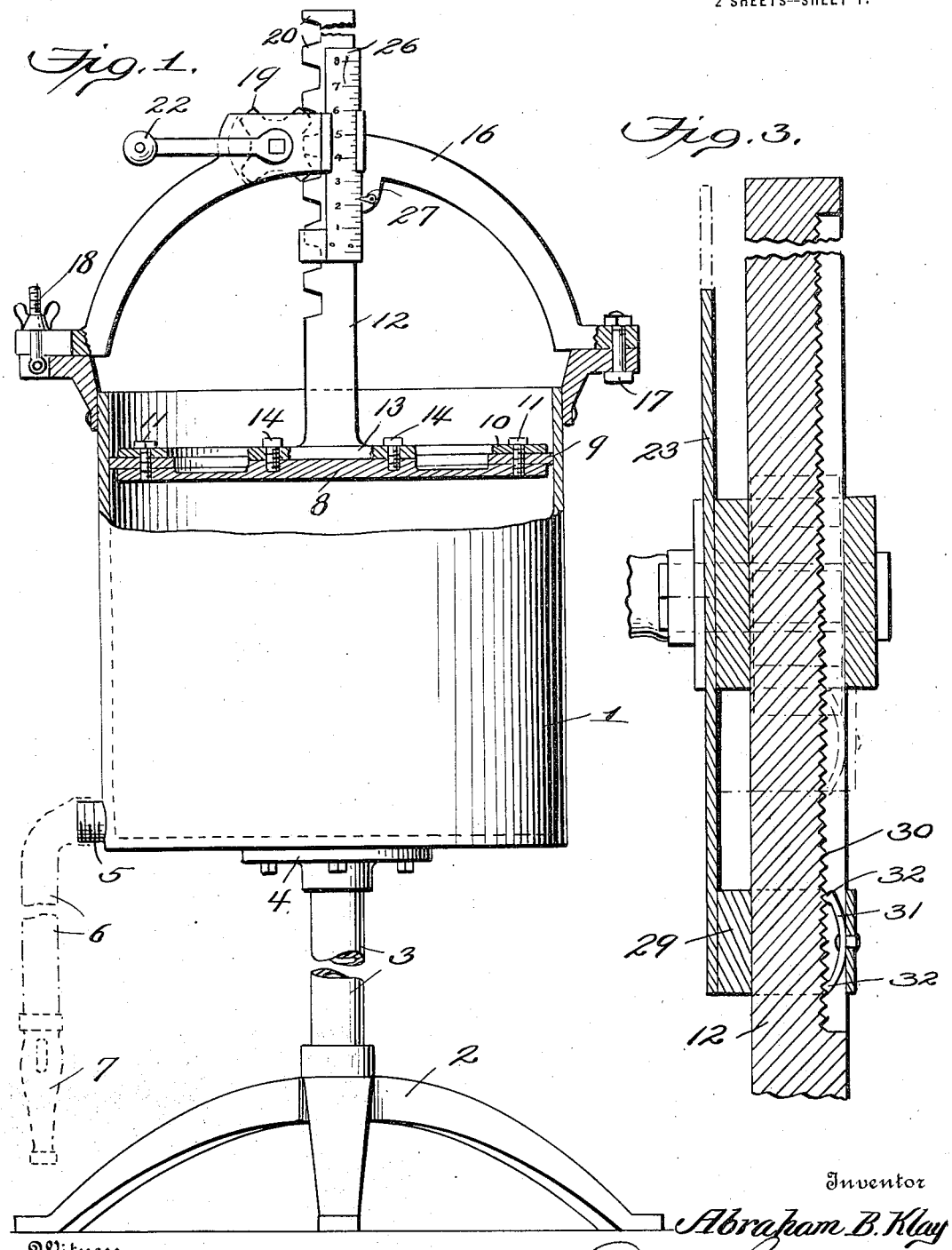

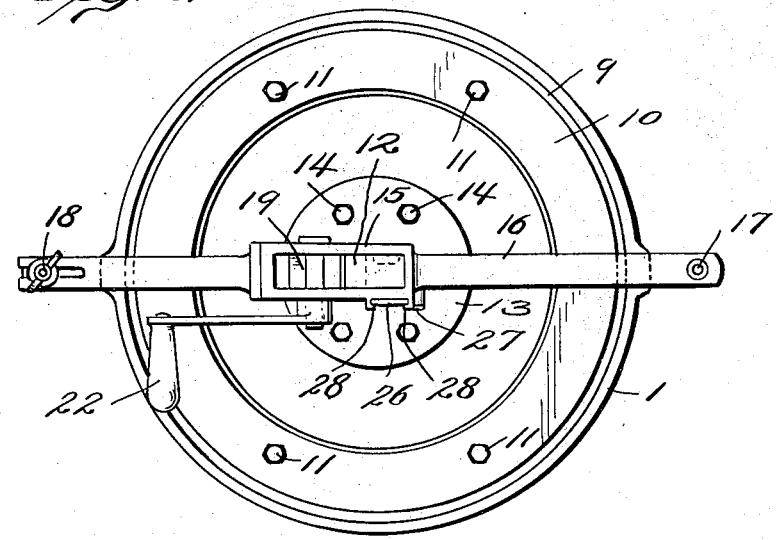
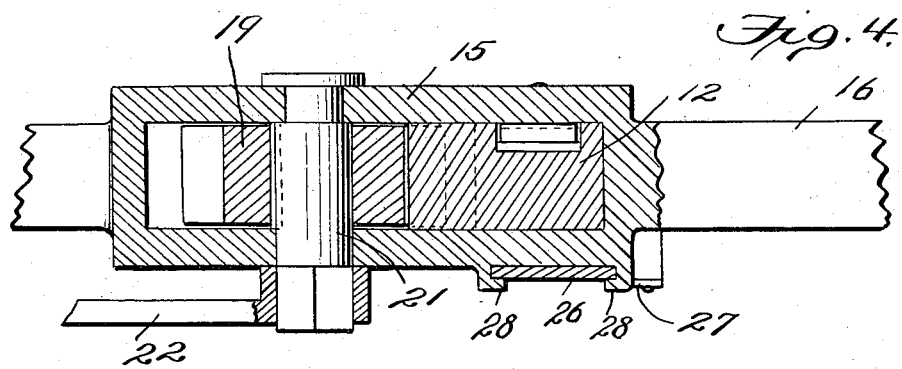
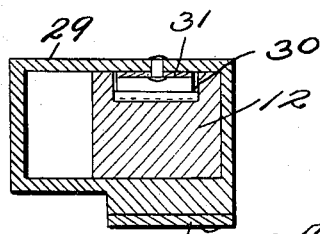

ABRAHAM B. KLAY, OF MODESTO, CALIFORNIA.

DISPENSING AND MEASURING APPARATUS FOR LUBRICANTS AND THE LIKE.

1,304,327.   Specification of Letters Patent.   Patented May 20, 1919.

Application filed January 24, 1918.   Serial No. 213,592.

*To all whom it may concern:*

Be it known that I, ABRAHAM B. KLAY, a citizen of the United States, residing at Modesto, in the county of Stanislaus and State of California, have invented new and useful Improvements in Dispensing and Measuring Apparatus for Lubricants and the like, of which the following is a specification.

My present invention relates to improvements in dispensing apparatus, and the primary object is to provide novel and improved apparatus of this character whereby fluid or semi-fluid substances, such for example as lubricating oils and greases, may be supplied or dispensed with facility and in measured quantities. The invention is especially adapted for use in garages, automobile service or repair shops, supply stations or the like, to supply or dispense lubricating oil or grease directly to the crank case, transmission case, or differential case of an automobile, it embodying means whereby any desired portion of the quantity of lubricant contained in the apparatus may be dispensed or delivered in measured amounts without requiring computation to determine the amount of each portion delivered, the measuring means being reset to zero prior to each dispensing operation and thus indicating directly the exact quantity of the lubricant dispensed at each operation.

To these and other ends, the invention consists in certain combinations and arrangements of parts, all as will be more fully hereinafter described, the novel features being pointed out particularly in the claims at the end of the specification.

In the accompanying drawings:

Figure 1 is a side elevation, partly in section, of a lubricant dispensing and measuring apparatus constructed in accordance with the present invention.

Fig. 2 is a top plan view of the apparatus as shown in Fig. 1.

Fig. 3 represents, on an enlarged scale, a section taken longitudinally through the plunger-actuating rack and the coöperative measuring device.

Fig. 4 represents a transverse section taken through the plunger-actuating rack, its guide, and its actuating pinion.

Fig. 5 represents a transverse section taken through the plunger-actuating rack and the coöperative measuring device.

Similar parts are designated by the same reference characters in the several views.

Dispensing and measuring apparatus constructed in accordance with the present invention is capable of use generally where it is desirable or necessary to feed or deliver measured quantities of substances of various kinds. It is particularly useful for dispensing lubricants, such as oils and greases, it delivering such substances in quantities which are measured and indicated directly by the apparatus, and, furthermore, it facilitates the introduction of lubricating oils and greases into the crank case, transmission case, or differential case of an automobile by feeding the lubricant directly to such parts, thus simplifying the handling of the lubricant and avoiding waste. The preferred embodiment of the invention is shown in the accompanying drawings and will be hereinafter described in detail. It is to be understood, however, that the invention is not restricted to the precise construction shown, as equivalent constructions are contemplated and will be included within the scope of the claims.

In the present instance the apparatus comprises a reservoir or container 1 for the lubricant, this reservoir being constructed of sheet metal or cast metal and preferably in the form of a cylinder of a size sufficient to contain a considerable charge of the lubricant whether in the form of oil or grease. The reservoir or container may be supported in different ways, it being mounted in the present instance on a stand 2 adapted to rest on the floor or ground, the stand having a rod or tube 3 extending upwardly therefrom and connected to the reservoir through the medium of a flange or head 4 which is bolted or otherwise fixed to the bottom of the reservoir. The reservoir has an outlet 5 in or near its bottom or discharge end and, preferably, a flexible hose 6 of appropriate size is fitted to the outlet 5 and provided with a nozzle 7 from which the lubricant is discharged, this nozzle being suitable for insertion into the filling opening of the crank case, transmission case, or differential case of an automobile. The lubricant is discharged from the reservoir or container through the operation of a plunger 8. This plunger may be made in different ways, it being preferably constructed of a metal disk having a ring of rubber or other suitable packing material 9 applied thereto, and the packing ring which closely fits the interior bore of the reservoir is clamped and held in place by a metal ring 10 which is secured in place by a suitable number of bolts or screws 11. The plunger is preferably operated by a reciprocatory rack bar 12, this rack bar in the present instance having a head 13 which is secured to the center of the plunger by screws 14, and the rack bar is guided to reciprocate in a housing 15 which is attached to or preferably formed as a part of a yoke 16. The yoke 16, which is preferably arched, as shown, bridges the open top of the reservoir and has one end connected to the rim of the reservoir by a hinge bolt 17 and its other end secured to the rim of the reservoir by a clamping or locking bolt 18. Reciprocation of the rack bar is effected, preferably, by a pinion 19 which is journaled in the housing 15 and coöperates with the rack teeth 20 on the rack bar 12. The shaft 21 of the pinion has a crank or handle 22 fixed thereto whereby the pinion may be conveniently rotated to effect operation of the rack bar.

The reservoir is preferably of a capacity sufficient to contain a volume of lubricant that will supply a number of charges, it being understood that the reservoir is filled while the plunger is withdrawn from the upper end thereof, the yoke 16 being displaced to permit filling, and that the lubricant is discharged from the reservoir by progressive advance of the plunger toward the lower or discharge end thereof. In such case each charge will be dispensed from the reservoir by a relatively short advance of the plunger; that is to say, the plunger will advance for only a part of its stroke in ejecting each charge of the lubricant, although the length of the different strokes will vary in accordance with the amounts of the charges delivered. The present invention provides means for measuring and indicating directly the amount of each charge delivered or dispensed by the apparatus. The measuring device consists in the present instance of a dial or scale 23 which is preferably made in the form of a plate and is adapted to occupy a position alongside of the rack bar 12. This dial or scale is calibrated either in units of liquid volume, as would be preferable if the apparatus handles oil, or, this indicator or dial may be calibrated in units of weight, which would be preferable if the apparatus handled grease, these calibrations being predetermined according to the amount of lubricant discharged from the reservoir for the corresponding distance through which the plunger and rack bar advance. An index or pointer 27 is fixed to the yoke 16 and arranged to coöperate with the calibrations 26 on the dial or indicator 23. Preferably, the housing 15 of the yoke is provided with guides 28 which overlie the dial or indicator plate and thus maintain the latter in parallelism with the rack bar, although permitting the dial or indicator plate to reciprocate with the rack bar. According to the present invention the dial or indicator plate is reset to zero preparatory to each dispensing operation, although it is connected to move with the rack bar during the advance of the latter incident to the dispensing operation. In consequence, the dial or indicator plate will indicate directly the amount of the substance dispensed or delivered at each operation, thus avoiding the necessity of computation. To this end the dial or indicator plate is provided with a sleeve 29 which is slidable longitudinally on the rack bar to permit resetting of the dial or indicator plate to zero, and suitable means is provided for retaining the dial or indicator plate in reset position relative to the rack bar whereby the dial or indicator plate will advance synchronously with the rack bar. Preferably, and as shown, the rack bar is provided with a ratchet face 30 and the sleeve 29 is provided with a spring 31 the ends 32 of which constitute pawls which coöperate with the ratchet face 30 of the rack bar. With this arrangement the dial or indicator plate may be manually shifted on the rack bar for the purpose of resetting it to zero preparatory to each dispensing operation, and the spring 31 will cause the dial or indicator plate to advance with the rack bar during the dispensing operation thereof. This operation is repeated until the plunger has advanced to its limit and has ejected the entire contents from the reservoir, the dial or indicator plate showing directly the amount in pounds or gallons of the lubricant dispensed at each operation.

The present invention provides an inexpensive and easily operated apparatus for dispensing in measured amounts any desired quantities of liquid and semi-liquid substances, the amounts dispensed being indicated directly in each instance, thus avoiding the inconvenience and the liability of error attending computations that would otherwise be necessary and also enabling the apparatus to be handled by uneducated attendants. It is especially useful in supplying lubricants to the different working mechanisms of automobiles, as it enables such service to be rendered quickly and easily by automobile service and supply stations, the varying amounts supplied in the different cases being measured and indicated directly by the apparatus.

What is claimed is:

1. In a dispensing apparatus, the combination with a reservoir having discharging means movably mounted therein, of a reciprocatory bar provided with a rack along one edge thereof and with a ratchet face in another portion of the same, an indicator plate mounted and shiftable on the said bar and provided with means to engage the ratchet face of the latter to hold the said plate in fixed adjusted position, the indicator plate being movable to zero position on the bar independently of the movement of said bar, an index coöperating with the indicator plate, and pinion means engaging the rack along one edge of the bar to unitedly move the bar and indicator plate.

2. In a dispensing apparatus, the combination with a reservoir having discharge means provided with a plunger and a sliding bar fixed thereto, a yoke movably secured to the reservoir and having a central housing in which the bar is mounted, an indicator plate having a sleeve directly engaging and partially embracing the bar and movable with and also independently of said bar, the plate also being mounted and movable in a portion of the housing, means for connecting the said plate to the bar and also permitting release of the plate from the bar for manual shifting of the said plate relative to the bar for zero resetting of the plate, and means engaging one edge of the bar for actuating the same and the plunger together with the plate when arranged to move with the bar.

In testimony whereof I have hereunto set my hand in presence of two subscribing witnesses.

ABRAHAM B. KLAY.

Witnesses:
HARRY D. BARTO,
Mrs. M. C. MONTGOMERY.